Figure 1:
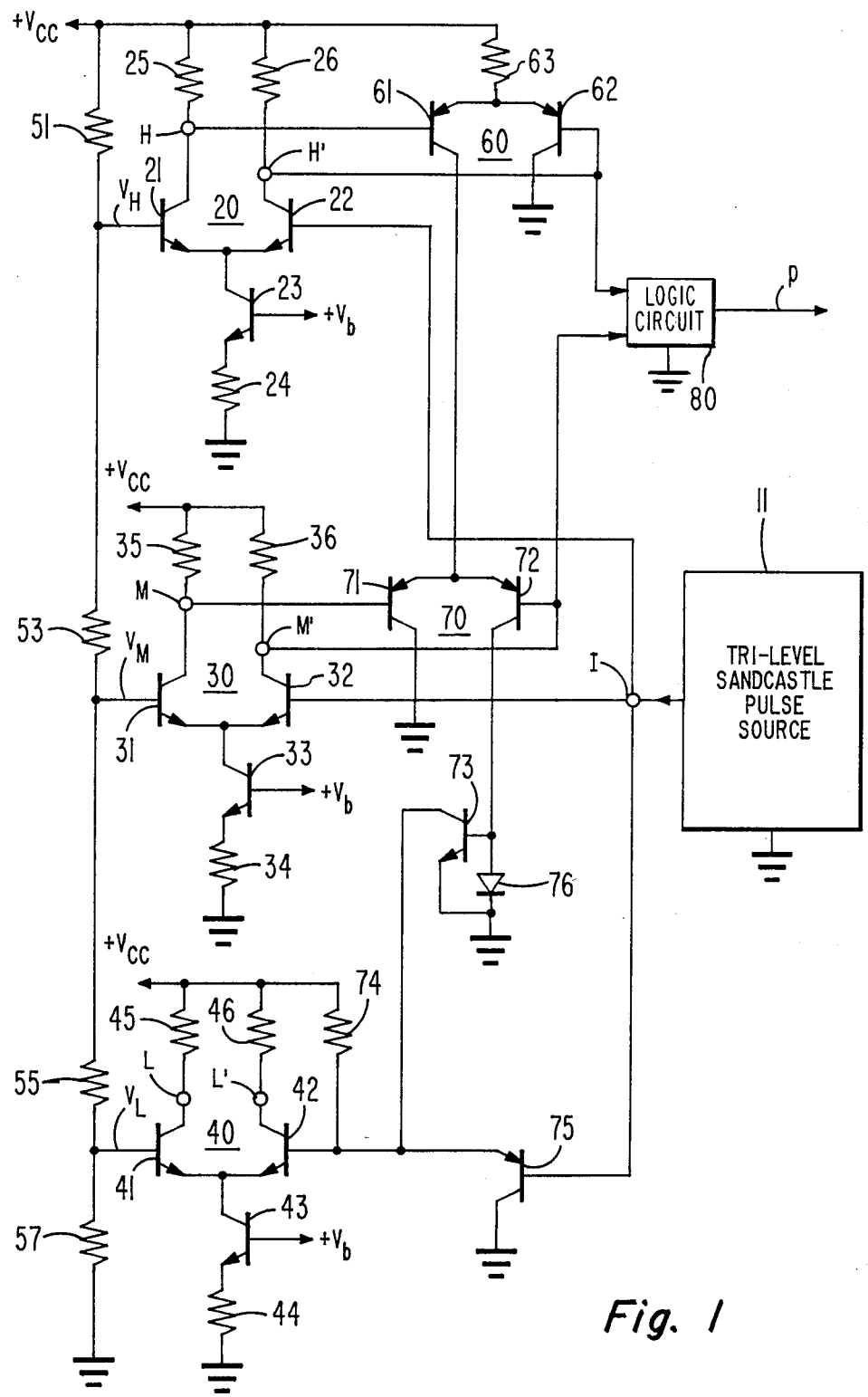

United States Patent [19]

Harwood et al.

[11] Patent Number: 4,555,722
[45] Date of Patent: Nov. 26, 1985

[54] TRI-LEVEL SANDCASTLE PULSE DECODER

[75] Inventors: Leopold A. Harwood, Bridgewater, N.J.; Robert L. Shanley, II, Indianapolis, Ind.

[73] Assignee: RCA Corporation, Princeton, N.J.

[21] Appl. No.: 561,331

[22] Filed: Dec. 14, 1983

[51] Int. Cl.$^4$ .............................................. H04N 9/535
[52] U.S. Cl. ........................................ 358/17; 358/20; 358/178; 307/360
[58] Field of Search ............... 358/17, 19, 20, 21 R, 358/160, 172, 178; 375/17, 20; 329/105; 328/115; 307/260, 264, 231, 360

[56] References Cited

U.S. PATENT DOCUMENTS

| | | | |
|---|---|---|---|
| 4,227,181 | 10/1980 | Brittain | 340/167 R |
| 4,263,610 | 4/1981 | Shanley, II | 358/20 |
| 4,337,478 | 6/1982 | Harlan | 358/20 |
| 4,371,793 | 2/1983 | Knight | 307/260 |

OTHER PUBLICATIONS

"Integrated NTSC Chrominance/Luminance Processor"-Harwood, et al., IEEE Trans. on Consumer El. (vol. CE-26), Nov. 1980, pp. 693-706.

Primary Examiner—Michael A. Masinick
Attorney, Agent, or Firm—E. M. Whitacre; P. J. Rasmussen; W. H. Meagher

[57] ABSTRACT

Trilevel sandcastle pulse decoder includes a trio of voltage comparators for comparing incoming sandcastle pulses with reference potentials of respectively different levels. One of the voltage comparators, which is subject to change in operating state in response to appearance of a given level of the sandcastle pulse, is precluded from operating state change in response to the appearance of the next higher level of the sandcastle pulse by control circuitry responsive to the output of a second of the voltage comparators. One of the decoder outputs is developed by logic circuitry responsive to outputs of two of the comparators.

10 Claims, 3 Drawing Figures

TRI-LEVEL SANDCASTLE PULSE DECODER

The present invention relates generally to apparatus for discriminating among the pulse components of a multilevel pulse train of the so-called "sandcastle" type, and particularly to a decoder of sandcastle pulses of a trilevel form.

Where a multiplicity of keying functions with different timing requirements are subject to performance within a common integrated circuit, a savings in terminal count may be realized by externally forming a composite, multilevel keying waveform for delivery to a single input terminal of the integrated circuit, and including within the integrated circuit level-sensitive decoder circuits for extracting respective keying waves of different timing from the delivered composite waveform (which is viewable as having a sandcastle-like profile).

An example of encoder circuitry suitable for use in the formation of a sandcastle pulse train with pulse components of two different levels (above a base level) is shown in U.S. Pat. No. 4,313,130—Yost. An example of decoder circuitry suitable for use in separating the pulse components of bilevel sandcastle pulses of the type generated by the Yost encoder is presented in an article entitled "Integrated NTSC Chrominance/Luminance Processor", by L. Harwood, et al., appearing on pages 693–706 of the IEEE Transactions on Consumer Electronics, Volume CE-26 (November 1980).

In the example of the above-discussed Harwood, et al. decoder, a retrace blanking waveform and a burst gating waveform, for use in luminance/chrominance signal processing circuits of a color television receiver, are separately derived from bilevel sandcastle pulses. The bilevel sandcastle pulses exhibit a first level during initial and concluding portions of the recurring periods when retrace blanking is desired, but exhibit a second higher level during intermediate portions of the recurring periods, which intermediate portions coincide in timing with recurring intervals during which the burst gating function is to be peformed. In this instance of sandcastle pulse use, there is an overlap of the keying functions to be performed, with retrace blanking continuing through each burst gating period. In the instance of a color television receiver of the type incorporating apparatus for automatic control of color kinescope biasing, a set of keying functions, inclusive of non-overlapping as well as overlapping functions, is desirably associated with the receiver's luminance/-chrominance signal processing circuits, as explained in the copending U.S. patent application Ser. No. 561,176 of R. Shanley, concurrently filed herewith and entitled "Control System For Luminance/Chrominance Signal Processing Circuits."

An illustrative arrangement for automatic coontrol of color kinescope biasing in a color television receiver is that described in U.S. Pat. No. 4,263,622—Hinn. In the Hinn arrangement, a control period, occuping a period of several successive line intervals within each vertical blanking interval, is set aside for monitoring a black level current produced by an electron gun under reference signal conditions, for detection of departures from a desired current level, and for readjustment of gun bias to oppose the undesired deparures. During a portion of the control period, the color kinescope grid receives a conduction-enhancing pulse; bias control is based upon information derived as indicative of the change in cathode current level introduced by the grid pulsing. An advantageous system for utilization of the above-described Hinn approach in maintenance of an appropriate bias relationship among the color kinescope's gun trio (in the face of aging and other parameter variations) is described in U.S. patent U.S. Pat. No. 4,484,228 of R. P. Parker.

For successful use of automatic kinescope bias (AKB) control in the manner exemplified by the structures of the aforementioned Hinn patent and Parker patent, it is recognized in the aforementioned Shanley patent application that the luminance/chrominance signal processing circuits, which process signal information for delivery to the color kinescope during the time periods intervening the periodically recurring kinescope bias control intervals, require some suitable form of manipulation during the kinescope bias control intervals to avoid undesirable distrubance or contamination of the current monitoring and bias adjustment functions.

To convey to a single chip input terminal timing information identifying the recurring kinescope bias control intervals, in addition to the timing information conveyed by the bilevel sandcastle pulses discussed above, it has been found appropriate to use sandcastle pulses of a trilevel form, i.e., with three different levels (above a base level) for the respective pulse components. Illustrative apparatus for forming suitable trilevel sandcastle pulses is shown in a copending U.S. patent application Ser. No. 561,333 of J. Hettiger, entitled "Trilevel Sandcastle Pulse Encoder" and concurrently filed herewith. In the pulse train produced by an encoder of the type disclosed by Hettiger: (a) during blanking portions of line intervals lying outside of the recurring kinescope bias control intervals, pulses of bilevel form (akin to those shown in the above-discussed Yost patent) appear, with burst gating pulse components at a high level preceded and followed by retrace blanking pulse components at a low level; (b) throughout the seven line periods occupied by each kinescope bias control interval, however, an AKB pulse component appears at an intermediate level falling between the high burst gating pulse component level and the low retrace blanking component level.

Because certain of the timed functions to be performed in the luminance/chrominance signal processing circuits in response to respective components of the trilevel sandcastle pulses are non-overlapping in nature, a greater level-discriminating burden is placed upon the on-chip trilevel sandcastle pulse decoder circuitry than is imposed upon the above-discussed bilevel sandcastle pulse decoder of the Harwood, et al. article, for example. To illustrate this point, several examples are considered below:

(1) Certain AKB-related keying operations in the luminance/chrominance signal processing circuits are required to be performed only during the recurring kinescope bias control intervals. If one simply relies upon recognition that the sandcastle pulse train has surpassed a threshold potential lying between the lower retrace blanking level and the intermediate AKB level to control development of the AKB-related keying pulses, the resultant keying waveform will have keying pulses not only during the recurring kinescope bias control intervals (as desired), but also (undesirably) during each high level burst gating pulse component appearance.

(2) Retrace blanking is desired during most retrace periods, but it is specifically not desired during the recurring kinescope bias control intervals so as to avoid disturbance of current monitoring operations. If one simply relies upon recognition that the sandcastle pulse train has surpassed a threshold potential lying between the pulse train's base level and the low retrace blanking level to control development of a retrace blanking waveform, the resultant waveform will undesirably include a blanking pulse during each intermediate level AKB pulse component appearance.

The present invention is directed to a trilevel sandcastle pulse decoder which avoids the problems recited above by employing a plurality of comparators intercoupled in a manner permitting discrimination between instances when a threshold potential related to one of the three sandcastle pulse levels has been exceeded by appearance of a sandcastle pulse component at said level, and instances when said threshold potential has been exceeded by appearance of a pulse component at the next higher of the three sandcastle pulse levels.

In accordance with the principles of the present invention, a trilevel sandcastle pulse decoder includes a first voltage comparison means for comparing the trilevel sandcastle pulse train with a first reference voltage of a voltage level lying between one of the voltage levels of the trilevel sandcastle pulse train and the next higher of the voltage levels of the trilevel sandcastle pulse train. Additional means, inclusive of second voltage comparison means for comparing the trilevel sandcastle pulse train with a second reference voltage lower than both said one and said next higher of the voltage levels of said trilevel sandcastle pulse train, are provided for normally developing a keying pulse output when said pulse train exhibits a voltage level significantly exceeding said second reference voltage. Control means are coupled to said keying pulse developing means and rendered responsive to an output of the first voltage comparison means to preclude said keying pulse development, however, when the trilevel sandcastle pulse train exhibits said next higher voltage level, by controlling the voltage at the signal input to the second voltage comparison means in a manner preventing its rise to a level significantly exceeding said second reference voltage. In accordance with an illustrative control technique, the control means arrests the keying pulse development by selectively disabling a signal path serving to supply the sandcastle pulses to the signal input of the second voltage comparison means in response to an output of the first voltage comparison means.

Figure 2:
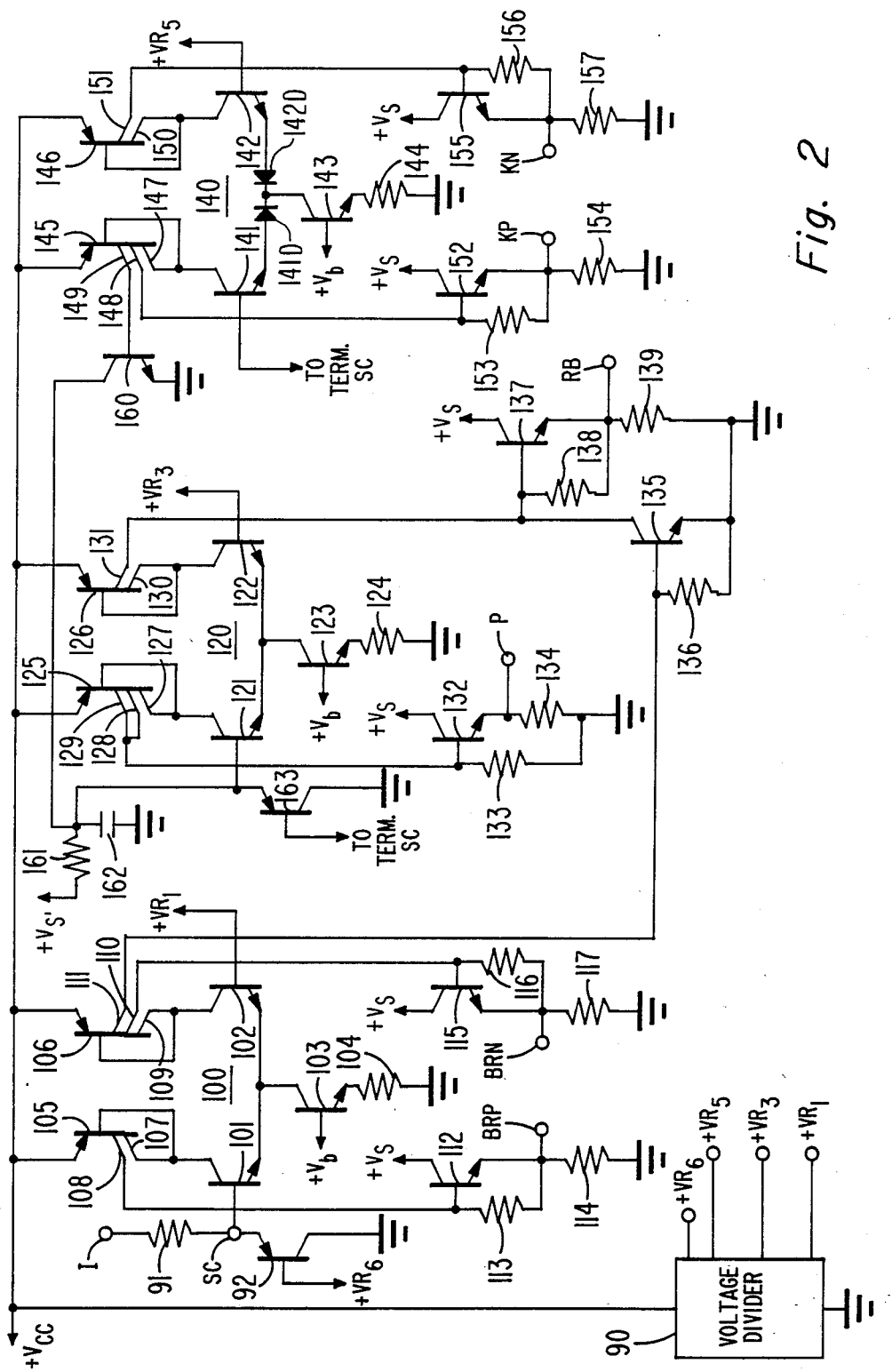
Figure 3:
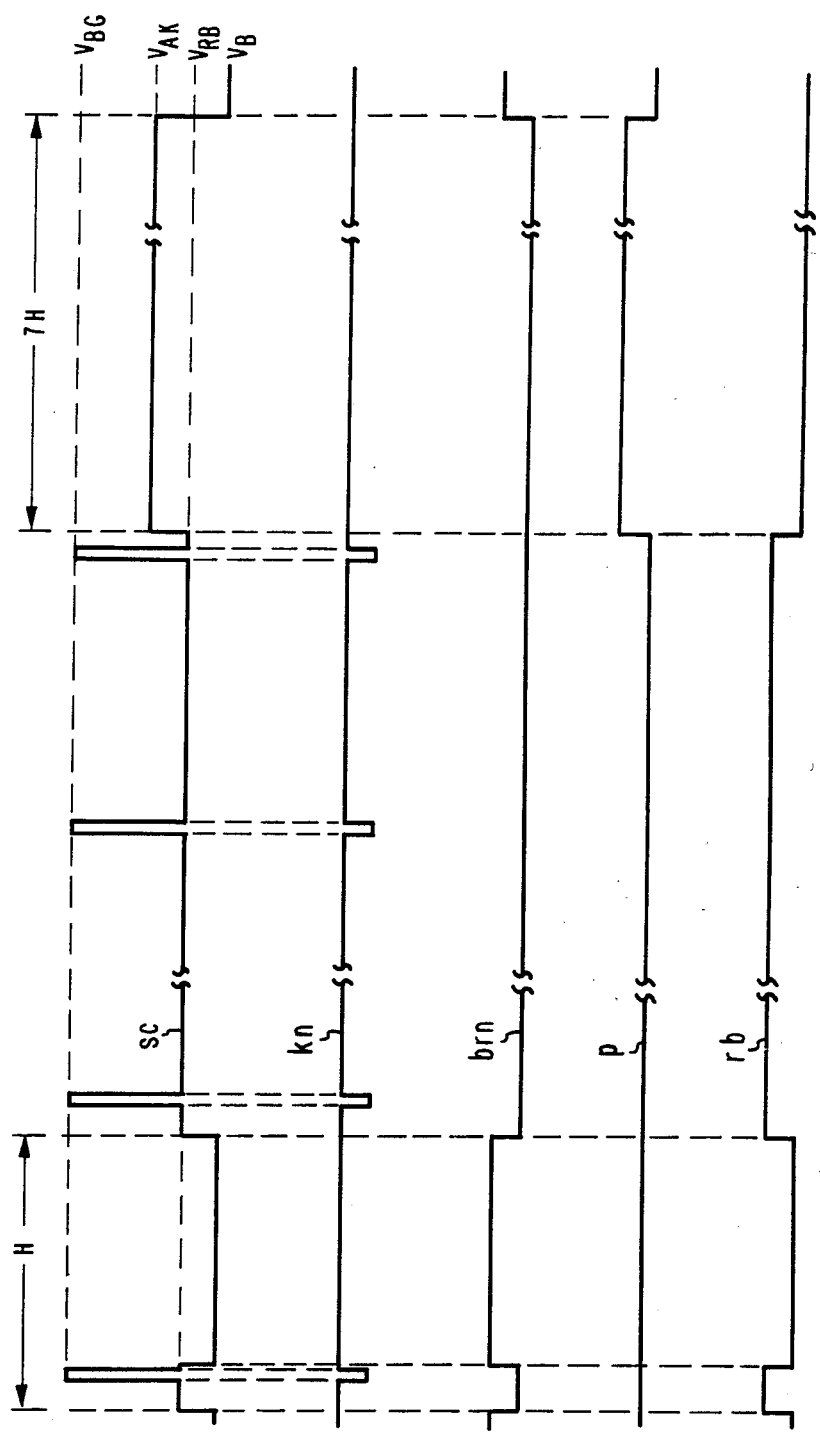

In the accompanying drawings:

FIGS. 1 and 2 illustrate, partially schematically, and partially by block representation, alternative embodiments of sandcastle pulse decoder circuits constructed in accordance with the present invention, for use in a color television receiver, and FIG. 3 illustrates graphically waveforms of aid in explaining the operation of the circuits of FIGS. 1 and 2.

In the arrangement of FIG. 1, a trilevel sandcastle pulse source 11 delivers a train of trilevel sandcastle pulses to a decoder input terminal I. Illustratively, the pulse source 11 comprises circuits of the form shown in the aforementioned copending Hettiger patent application, with the waveform of the delivered pulse train as shown graphically by curve "sc" of FIG. 3. Terminal I illustratively comprises an input terminal of an integrated circuit bearing luminance/chrominance signal processing circuits of a color television receiver.

As shown in FIG. 3, waveform "sc" includes positive-going retrace blanking pulse components at a first voltage level ($V_{RB}$) above a base level ($V_B$), positive-going burst gating pulse components at a second higher voltage level ($V_{BG}$), positive-going kinescope bias control interval timing pulse components at a third intermediate voltage level ($V_{AK}$) lying between ($V_{RB}$) and $V_{BG}$. Each of the intermediate level pulses coincides with a period of seven line intervals during a post-sync portion of the vertical blanking interval of a received color television signal. Each of the burst gating pulse components is timed to coincide with a "backporch" segment of horizontal blanking portions of line intervals (outside the recurring kinescope bias control intervals) of the received signal. The retrace blanking pulse components encompass those portions of the periodic horizontal and vertical beam retrace periods (outside the recurring kinescope bias control intervals) which are not occupied by burst gating pulse components.

The apparatus of FIG. 1 includes a trio of voltage comparators 20, 30 and 40 for comparing the sandcastle pulses delivered to terminal I with respective reference voltages ($V_H$, $V_M$, $V_L$) derived from a common voltage divider. The voltage divider is formed by resistors 51, 53, 55 and 57, connected in series between the positive terminal ($+V_{cc}$) and the negative terminal (ground) of an operating potential supply, with a high reference voltage $V_H$ appearing at the junction of resistors 51 and 53, with a low reference voltage $V_L$ appearing at the junction of resistors 55 and 57, and with an intermediate reference voltage $V_M$ appearing at the junction of resistors 53 and 55.

Comparator 20 includes a pair of NPN transistors 21 and 22, disposed in a differential amplifier configuration with their emitter electrodes interconnected. A current source for the comparator transistors 21, 22 is formed by an NPN transistor 23 disposed with its collector electrode directly connected to the interconnected emitter electrodes of transistors 21 and 22, with its base electrode connected to the positive terminal ($+V_b$) of a bias potential supply, and with its emitter electrode returned to ground via an emitter resistor 24. The collector electrodes of transistors 21 and 22 are connected to the $+V_{cc}$ supply terminal via respective load resistors 25 and 26. A direct connection to the junction of resistors 51 and 53 supplies the high reference voltage $V_H$ to the base electrode of transistor 21, while a direct connection to terminal I delivers the incoming sandcastle pulses to the base electrode of transistor 22.

Comparator 30 includes a pair of NPN transistors 31 and 32, disposed in a differential amplifier configuration with their emitter electrodes interconnected. A current source for the comparator transistors 31, 32 is formed by an NPN transistor 33 disposed with its collector electrode directly connected to the interconnected emitter electrodes of transistors 31 and 32, with its base electrode connected to the $+V_b$ supply terminal, and with its emitter electrode returned to ground via an emitter resistor 34. The collector electrodes of transistors 31 and 32 are connected to the $V_{cc}$ supply terminal via respective load resistors 35 and 36. A direct connection to the junction of resistors 53 and 55 supplies the intermediate reference voltage $V_M$ to the base electrode of transistor 31, while a direct connection to terminal I delivers the incoming sandcastle pulses to the base electrode of transistor 32.

Comparator 40 includes a pair of NPN transistors 41 and 42, disposed in a differential amplifier configuration with their emitter electrodes interconnected. A current source for the comparator transistors 41, 42 is formed by an NPN transistor 43 disposed with its collector electrode directly connected to the interconnected emitter electrodes of transistors 41 and 42, with its base electrode connected to the $+V_B$ supply terminal, and with its emitter electrode returned to ground via an emitter resistor 44. The collector electrodes of transistors 41 and 42 are connected to the $+V_{cc}$ supply terminal via respective load resistors 45 and 46. A direct connection to the junction of resistors 55 and 57 supplies the low reference voltage $V_L$ to the base electrode of transistor 41. A coupling path for delivering incoming sandcastle pulses to the base electrode of transistor 42 is provided by an emitter-follower formed by a NPN transistor 75, disposed with its collector electrode grounded with its base electrode directly connected to terminal I, and with its emitter electrode directly connected to the base electrode of transistor 42 and returned to the $+V_{cc}$ supply terminal via an emitter resistor 74.

A pair of differential amplifiers 60, 70 and an NPN control transistor 73 are intercoupled to form a control system for selectively disrupting the sandcastle pulse coupling path provided via emitter-follower transistor 75. Differential amplifier 60 is responsive to outputs of comparator 20 and includes a pair of PNP transistors 61 and 62 disposed with interconnected emitter electrodes which are returned to the $+V_{cc}$ supply terminal via a common emitter resistor 63. The comparator output terminal H (at the collector electrode of comparator transistor 21) is directly connected to the base electrode of amplifier transistor 61, while the comparator output terminal H' (at the collector electrode of comparator transistor 22) is directly connected to the base electrode of amplifier transistor 62. The collector electrode of transistor 62 is grounded.

Amplifier transistor 61 serves as a selectively enabled current source for differential amplifier 70, which incorporates a pair of PNP transistors 71 and 72, disposed with interconnected emitter electrodes directly connected to the collector electrode of transistor 61. Differential amplifier 70 is responsive to outputs of comparator 30, with the base electrode of amplifier transistor 71 directly connected to comparator output terminal M (at the collector electrode of comparator transistor 31), and with the base electrode of amplifier transistor 72 directly connected to comparator output terminal M' (at the collector electrode of comparator transistor 32). The collector electrode of transistor 71 is grounded.

The collector current of transistor 72 is supplied as input current to a current mirror formed by the NPN control transistor 73 and a diode 76. Control transistor 73 is disposed with its base electrode directly connected to the collector electrode of transistor 72 and to the anode of diode 76, with its emitter electrode directly connected to ground and to the cathode of diode 76, and with its collector electrode directly connected to the base electrode of comparator transistor 42 in comparator 40.

The arrangement of FIG. 1 additionally includes a logic circuit 80 having a pair of inputs respectively responsive to an output of comparator 20 appearing at terminal H' and to an output of comparator 30 appearing at terminal M'. Logic current 80, performing an exclusive-OR function, develops an output which takes the form shown by waveform "p" of FIG. 3, as will be explained in greater detail in the following description of the operation of the arrangement of FIG. 1.

When the sandcastle pulse train at terminal I exhibits the base level ($V_B$), the voltage at the respective signal inputs of the comparators 20,30 and 40 (i.e., the voltages at the base electrodes of transistors 22,32 and 42) are each sufficiently lower than the respective reference potentials at the reference inputs of the comparators (i.e., the potentials at the base electrodes of transistors 21,31 and 41) that each of the signal-driven comparator transistors (22,32,42) is cut off. In such a state, each of the reference-driven comparator transistors (21,32,41) conducts all of the current conveyed by the respective current source transistor (23,33,43), the potentials at comparator output terminals H,M and L (at the respective collector electrodes of transistors 21,31,41) are low, and the potentials at comparator output terminals H', M' and L' (at the respective collector electrodes of transistors 22, 32, 42) are high.

Under these circumstances, transistor 61 of the differential amplifier 60 is conducting, while transistor 62 is cut off. Current supplied by transistor 61 to energize differential amplifier 70 is passed to ground by transistor 71, while transistor 72 is cut off, disabling diode 76 and control transistor 73. With both of its inputs high, logic circuit 80 provides an output at a low base level.

During a blanking portion of a line interval outside the kinescope bias control interval, when the sandcastle pulse train rises to the retrace blanking level $V_{RB}$, comparator 40 switches to a different operating state, as the voltage at the base electrode of transistor 42 rises sufficiently above $V_L$ to cut off transistor 41 and allow all of the current provided by transistor 43 to pass through transistor 42. The potential at output terminal L' swings low, while the potential at output terminal L swings high. Since the retrace blanking level $V_{RB}$ is significantly lower than the reference levels $V_M$ and $V_H$, the operating states of comparators 30 and 20 are not affected by the $V_{RB}$ level appearance, with transistors 32 and 22 remaining in a cutoff condition. The conducting conditions of transistors 61 and 72 continue as described above, and the output of logic circuit 80 remains at a low base level.

During the "backporch" appearance of a signal rise to the burst gating level $V_{BG}$ at terminal I, however, the operating states of both of the comparators 20 and 30 are changed, with transistors 21 and 31 driven to cutoff. The potentials at output terminals H and M swing high, while the potentials at output terminals H' and M' swing low. Under these circumstances, transistor 62 of the differential amplifier 60 is rendered conducting, while transistor 61 is cut off to disable differential amplifier 70. Diode 76 and control transistor 73 thus continue in a cutoff condition. With both its inputs low, logic circuit 80 continues to provide an output at a low base level. The outputs of comparator 40 are not disturbed by the signal rise to the $V_{BG}$ level, with the potential at output terminal L continuing high, and the potential at output terminal L' remaining low.

A signal return to the retrace blanking level $V_{RB}$ at the conclusion of the burst gating pulse appearance restores comparators 20 and 30 to their original operating states, while comparator 40 continues to exhibit a high potential at terinal L and a low potential at terminal L'. The output of logic circuit continues at a low base level. Comparator 40 joins comparators 20 and 30 in the original operating state upon a return of the signal level to the base level $V_B$ at the blanking interval conclusion.

While the above-described operations are descriptive of the conditions obtained outside the recurring kinescope bias control intervals, a different situation is presented during each kinescope bias control interval, as will now be described. At the beginning of a kinescope bias control interval, when the signal level at terminal I rises from a $V_{RB}$ level to the AKB-related level $V_{AK}$ (lying between the intermediate reference potential $V_M$ and the high reference potential $V_H$), the operating state of comparator 30 is switched from its original (base level) state, whereas the operating state of comparator 20 is not switched from its original state. The potential at output terminal M swings high and the potential at output terminal M' swings low, whereas the potential at output terminal H remains low and the potential at output terminal H' remains high.

Under these circumstances, transistor 61 conducts to energize differential amplifier 70; transistor 71 of differential amplifier 70, however, is cut off, and transistor 72 conducts, enabling conduction by diode 76 and control transistor 73. Conduction by control transistor 73 clamps the base electrode of transistor 42 to a low potential, disabling the emitter-follower transistor 75 and causing the switching of comparator 40 back to its original operating state. Thus, the potential at output terminal L is low and the potential at output terminal L' is high throughout the kinescope bias control interval.

Waveform "rb" of FIG. 3 is illustrative of the output pulse train obtained at terminal L of comparator 40. The pulse train "rb" includes positive-going pulses suitable for retrace blanking use, which however, disappear (as desired) during the seven-line period encompassed by the kinescope bias control interval. Through the operation of the control system 60, 70, 76, 73, comparator 40 is selectively precluded from responding to the $V_{AK}$ level pulse components.

During the kinescope bias control interval, the inputs to the logic circuit 80 are mutually different, with a low potential supplied from terminal M', whereas a high potential is supplied from terminal H'. Accordingly, the output of logic circuit 80 is high during the kinescope bias control interval. The output of logic circuit 80, as illustrated by waveform "p" of FIG. 3, is a train of positive-going pulses uniquely indicative of kinescope bias control interval timing, and free (as desired) of pulse appearance during the $V_{BG}$ level intervals.

Waveform "kn" is illustrative of an output pulse train appearing at output terminal H' of comparator 20. The pulse train "kn" includes negative-going pulses, suitable for burst gating and other "backporch" keeping uses, which, however, disappear (as desired) during the seven-line period occupied by the kinescope bias control interval.

An alternative embodiment of the present invention is presented in FIG. 2. The sandcastle pulse-decoder of FIG. 2 also includes a trio of voltage comparators (100, 120, 140), associated with a common voltage divider 90 connected between the $+V_{CC}$ and ground terminals of an oprating potential supply. The voltage divider 90 develops a plurality of reference DC voltages (of successively higher positive voltage levels) at terminals $+VR_1$, $+VR_3$, $+VR_5$ and $+VR_6$.

The retrace blanking level $V_{RB}$ of the sandcastle pulse train delivered to terminal I of FIG. 2 falls between the reference potentials at terminals $+VR_1$ and $+VR_3$. The AKB-related level $V_{AK}$ falls between the reference potentials at terminals $+VR_3$ and $+VR_5$, while the burst gating level $V_{BG}$ lies above the reference potential at terminal $+VR_5$.

Voltage comparator 100 includes a pair of NPN transistors 101 and 102, disposed with interconnected emitter electrodes. An NPN transistor 103, functioning as a current source, has its collector electrode directly connected to the joined emitter electrodes of comparator transistors 101 and 102. The base electrode of current source transistor 103 is connected to a $+V_b$ bias supply terminal, while the emitter electrode thereof is returned to ground via an emitter resistor 104.

The lowest of the reference potentials developed by voltage divider 90 is supplied from terminal $+VR_1$ to the base electrode of the comparator transistor 102. Sandcastle pulses appearing at the sandcastle pulse input terminal I are coupled via resistor 91 to the sandcastle pulse supply terminal SC, to which the base electrode of comparator transistor 101 is directly connected. A PNP clamping transistor 92 is disposed with its emitter electrode connected to terminal SC, with its collector electrode grounded, and with its base electrode connected to terminal $+VR_6$ (at which appears the highest of the reference potentials developed by divider 90). Transistor 92 is normally cut off, but its presence ensures that the most positive swing of the sandcastle pulse train at terminal SC will be limited to a potential that is one $V_{be}$ higher than the referred potential at terminal $+VR_6$.

A dynamic load for comparator transistor 101 is provided by a multiple-collector PNP transistor 105. The emitter electrode of load transistor 105 is connected to the $+V_{CC}$ supply terminal. A collector electrode (107) of load transistor 105 is directly connected to the base electrode thereof and to the collector electrode of comparator transistor 101. An additional collector electrode (108) of load transistor 105 supplies a mirrored version of the collector current of comparator transistor 101 to the base electrode of an emitter-follower transistor 112 of NPN form. The collector electrode of transistor 112 is directly connected to a positive supply terminal $V_s$ while the emitter electrode of transistor 112 is directly connected to a first decoder output terminal BRP, and via an emitter resistor 114 to ground. A resistor 113 shunts the base-emitter path of the emitter-follower transistor 112.

A dynamic load for comparator transistor 102 is provided by a multiple-collector PNP transistor 106. The emitter electrode of load transistor 106 is connected to the $V_{CC}$ supply terminal. A collector electrode (109) of load transistor 106 is directly connected to the base electrode thereof and to the collector electrode of comparator transistor 102. An additional collector electrode (110) of load transistor 106 supplies a mirrored version of the collector current of comparator transistor 102 to the base electrode of an emitter-follower transistor 115 of NPN form. The collector electrode of transistor 115 is directly connected to the $+V_s$ supply terminal while the emitter electrode of transistor 115 is directly connected to a second decoder output terminal BRN, and via an emitter resistor 117 to ground. A resistor 116 shunts the base-emitter path of the emitter-follower transistor 115.

Load transistor 106 has a third collector electrode (111) supplying a mirrored version of the collector current of comparator transistor 102 to control circuitry to be subsequently described.

Voltage comparator 120 includes a pair of NPN transistors 121 and 122, disposed with interconnected emitter electrodes. An NPN transistor 123, functioning as a current source, has its collector electrode directly connected to the joined emitter electrodes of comparator transistors 121 and 122. The base electrode of current source transistor 123 is connected to the $+V_b$ bias supply terminal, while the emitter electrode thereof is returned to ground via an emitter resistor 124.

An intermediate one of the reference potentials developed by divider 90, appearing at terminal $+VR_3$, is supplied to the base electrode of the comparator transistor 122. A PNP transistor 163 is disposed as an emitter-follower for coupling sandcastle pulses from the sandcastle pulse supply terminal SC to the base electrode of the comparator transistor 121 Transistor 163 is disposed with its base electrode directly connected to terminal SC, with its collector electrode grounded, and with its emitter electrode directly connected to the base electrode of comparator transistor 121, and via an emitter resistor 161 to a positive supply terminal $V_S'$. A capacitor 162 is coupled between the emitter electrode of the emitter-follower transistor 163 and ground.

A dynamic load for comparator transistor 121 is provided by a multiple-collector PNP transistor 125. The emitter electrode of transistor 125 is connected to the $+V_{CC}$ supply terminal. A collector electrode (127) of transistor 125 is directly connected to the base electrode thereof and to the collector electrode of comparator transistor 121. Additional collector electrodes (128, 129) of transistor 125 are joined to supply a mirrored version of the collector current of comparator transistor 121 to the base electrode of an emitter-follower transistor 132 of NPN form. The collector electrode of transistor 132 is directly connected to the $V_s$ supply terminal, while the emitter electrode of transistor 132 is directly connected to a third decoder output terminal P, and via an emitter resistor 134 to ground. A resistor 133 is connected between the base electrode of the emitter-follower transistor 132 and ground.

A dynamic load for comparator transistor 122 is provided by a multiple-collector PNP transistor 126. The emitter electrode of load transistor 126 is connected to the $+V_{CC}$ supply terminal. A collector electrode (130) of load transistor 126 is directly connected to the base electrode thereof and to the collector electrode of comparator transistor 122. An additional collector electrode (131) of load transistor 126 supplies a mirrored version of the collector current of comparator transistor 122 to the base electrode of an emitter-follower transistor 137 of NPN form. The collector electrode of transistor 137 is directly connected to the $+V_s$ supply terminal, while the emitter electrode of transistor 137 is directly connected to a fourth decoder output terminal RB, and via an emitter resistor 139 to ground. A resistor 138 shunts the base-emitter path of the emitter-follower transistor 137.

The base electrode of the emitter-follower transistor 137 is directly connected to the collector electrode of an NPN control transistor 135. The emitter electrode of control to transistor 135 is grounded, while the base electrode thereof is directly connected to collector electrode 111 of the load transistor 106 of comparator 100. A resistor 136 shunts the base-emitter path of control transistor 135.

Voltage comparator 140 includes a pair of NPN transistors 141 and 142, disposed with their emitter electrodes interconnected via a series combination of diodes 141D and 142D. Diodes 141D and 142D are disposed with their cathodes joined, with the anode of diode 141D connected to the emitter electrode of comparator transistor 141, and with the anode of diode 142D connected to the emitter electrode of comparator transistor 142. An NPN transistor 143, functioning as a current source, has its collector electrode directly connected to the junction of diodes 141D, 142D. The base electrode of current source transistor 143 is connected to the $+V_b$ bias supply terminal, while the emitter electrode thereof is returned to ground via an emitter resistor 144.

The second highest of the reference potentials developed by voltage divider 90 is supplied from terminal $+VR_5$ to the base electrode of comparator transistor 142. The base electrode of comparator transistor 141 is directly connected to terminal SC to receive the incoming sandcastle pulses.

A dynamic load for the comparator transistor 141 is provided by a multiple-collector PNP transistor 145. The emitter electrode of load transistor 145 is connected to the $+V_{CC}$ supply terminal. A collector electrode (147) of load transistor 145 is directly connected to the base electrode thereof and to the collector electrode of comparator transistor 141. An additional collector electrode (148) of load transistor 145 supplies a mirrored version of the collector current of comparator transistor 141 to the base electrode of an emitter-follower transistor 152 of NPN form. The collector electrode of transistor 152 is directly connected to the $+V_s$ supply terminal, while the emitter electrode of transistor 152 is directly connected to a fifth decoder output terminal KP, and via an emitter resistor 154 to ground. A resistor 153 shunts the base-emitter path of the emitter-follower transistor 152.

A third collector electrode (149) of load transistor 145 supplies an additional mirrored version of the collector current of comparator transistor 141 to the base electrode of a control transistor 160 of NPN form. The emitter electrode of control transistor 160 is grounded, while the collector electrode thereof is directly connected to the base electrode of comparator transistor 121 (in comparator 120).

A dynamic load for the comparator transistor 142 is provided by a multiple-collector PNP transistor 146. The emitter electrode of load transistor 146 is connected to the $+V_{CC}$ supply terminal. A collector electrode (150) of load transistor 146 is directly connected to the base electrode thereof and to the collector electrode of comparator transistor 142. An additional collector electrode (151) of load transistor 146 supplies a mirrored version of the collector current of comparator transistor 142 to the base electrode of an emitter-follower transistor 155 of NPN form. The collector electrode of transistor 155 is directly connected to the $+V_s$ supply terminal, while the emitter electrode of transistor 155 is directly connected to a sixth decoder output terminal KN, and via an emitter resistor 157 to ground. A resistor 156 shunts the base-emitter path of emitter-follower transistor 155.

Waveforms "brn", "p", "rb", and "kn" of FIG. 3 illustrate the output pulse trains appearing, respectively, at the second decoder output terminal BRN, at the third decoder output terminal P, at the fourth decoder output terminal RB, and at the sixth decoder output terminal KN. It should be appreciated that the waveform of the pulse train appearing at the second decoder output terminal BRP corresponds to an inverted version of waveform "brn", while the waveform of the pulse train appearing at the fifth decoder output terminal KP corresponds to an inverted version of waveform "kn".

In operation of the FIG. 2 decoder, when the sandcastle pulse train at terminal I exhibits the base level ($v_B$), the operating states of the comparators 100, 120 and 140 are all the same, with each of the signal-driven comparator transistors (101, 121, 141) in a cutoff condition. As a consequence, each of the emitter-follower transistors 122, 132, and 152 are also cut off, resulting in exhibition of a low base level at decoder output terminals BRP, P and KP. A high base level is exhibited at decoder output terminals BRN and KN as emitter-followers transistors 115 and 155 conduct in response to currents delivered from load transistor 106 and 146, respectively. A low base level, however, is exhibited at decoder output terminal RB. Although load transistor 126 is conducting, the base electrode of emitter-follower transistor 137 is held down by the conduction of control transistor 135 so as to maintain emitter-follower transistor 137 in a cutoff condition.

During a blanking portion of a line interval outside the kinescope bias control interval, when the sandcastle pulse train rises to the retrace blanking level $V_{RB}$, comparator 100 switches to a different operating state, as the voltage at the base electrode of transistor 101 rises sufficiently above the reference potential at terminal $+VR_1$ to cut off transistor 102 and allow all of the current provided by transistor 103 to pass through transistor 101. Output terminal BRP swings high as emitter-follower transistor 112 conducts, while output terminal BRN swings low as emitter-follower transistor 115 ceases conduction.

Since the retrace blanking level $V_{RB}$ is significantly lower than the reference potentials at terminals $+VR_3$ and $+VR_5$, the operating states of comparators 120 and 140 are not affected by the $V_{RB}$ level appearance, with transistors 121 and 141 remaining in a cutoff condition. Output terminals P, KP and KN, thus, remain at their respective base levels. Output terminal RB, however, swings high, as the control transistor 135 ceases conduction, releasing the base electrode of emitter-follower transistor 137 which commences conduction.

During the "backporch" appearance of a signal rise to the burst gating level $V_{BG}$ at terminal I, the operating state of comparator 140 is changed, with transistor 142 driven to cutoff. Output terminal KP swings high as emitter-follower transistor 152 conducts, while output terminal KN swings low as emitter-follower transistor 155 ceases conduction.

Despite the fact that the burst gating level $V_{BG}$ is significantly higher than the reference potential at terminal $+VR_3$, comparator 120 does not change operating states in response to the signal rise to the $V_{BG}$ level, due to the operation of control transistor 160 (rendered conducting in response to conduction by load transistor 145 when comparator 140 changes operating state). Conduction by control transistor 160 holds the base electrode of comparator transistor 121 well below the reference potential at terminal $+VR_3$, and cuts off the emitter-follower transistor 163 to isolate the base electrode of comparator transistor 121 from terminal SC. To avoid the possibility of a transient change in operating state of comparator 120 during the signal rise to the $V_{BG}$ level, resistor 161 and capacitor 162 cooperate to sufficiently delay the rise in potential at the base electrode of transistor 121 as to ensure that control transistor 160 commences conduction before a change in the operating state of comparator 120 can take place.

With the outputs of comparators 100 and 120 undisturbed by the upward signal shift to the $V_{BG}$ level, output terminals BRP and RB remain high while output terminals BRN and P remain low during the $V_{BG}$ level appearance.

A signal return to the retrace blanking level $V_{RB}$ at the conclusion of the burst gating pulse appearance restores comparator 140 to its original operating state, with output terminal KP swinging low and output terminal KN swinging high. Output terminals BRP and RB remain high, and output terminal BRN and P remain low.

Comparator 100 joins comparators 120 and 140 in the original operating state upon a return of the signal to the base level $V_B$ at the conclusion of a horizontal blanking interval, restoring terminal BRP and RB to a low base level and terminal BRN to a high base level.

During a kinescope bias control interval, when the signal at terminal I is at the AKB-related level $V_{AK}$, both of the comparators 100 and 120 are switched from their original (base level) operating states. Output terminals BRP and P are high due to conduction by emitter-follower transistors 112 and 132, while output terminal BRN is low due to absence of conduction by emitter-follower transistor 115. Output terminal RB is low despite the cutoff of control transistor 135, due to the cutoff of load transistor 126.

Since the $V_{AK}$ level lies significantly below the reference potential at terminal $+VR_5$, the $V_{AK}$ level appearance does not cause a change in operating state of comparator 140. Accordingly, output terminal KP remains at a low base level, while output terminal KN remains at a high base level, throughout the kinescope bias control level.

The output pulse trains developed at terminals KP and KN, suitable for burst gating and other "backporch" keying purposes (described in greater detail in the aforementioned co-pending Shanley application), are desirably devoid of pulse appearances during each kinescope bias control interval. The output pulse train developed at terminal P is uniquely indicative of the recurring kinescope bias control intervals and desirably free of pulse appearances during all other intervals. The output pulse train at terminal RB, suitable for retrace blanking uses, is desirably devoid of pulse appearances during the recurring kinescope bias control intervals. The output pulse trains at terminals BRP and BRN, with pulse appearances corresponding to a combination of the pulse appearances in the outputs at terminal P and RB, are useful for brightness control keying purposes, as described in greater detail in the aforementioned copending Shanley application.

It will be noted that transistors 135 and 137 cooperate to perform a logic function with respect to inputs developed by the respective comparators 100 and 120. When both of the load transistors 106 and 126 are simultaneously conducting, i.e., during the base level ($V_B$) appearances, and when both of the load transistors 106 and 126 are simultaneously cut off, i.e., during the AKB-related level ($V_{AK}$) appearances, output terminal RB remains low. During appearances of the retrace blanking level $V_{RB}$ or the burst gating level $V_{BG}$, however, when cutoff of load transistor 106 accompanies conduction by load transistor 126, output terminal RB swings high.

With respect to the above-described three input conditions, the circuit formed by transistors 135 and 137 behaves in the manner of an exclusive-OR gate. While the circuit formed by transistors 135 and 137 would not exhibit an exclusive-OR gate response to a fourth input condition (conduction by load transistor 106 acompanying cutoff of load transistor 126), such an input condition does not arise in operation of the FIG. 2 decoder.

What is claimed is:

1. A sandcastle pulse decoder for use with a sandcastle pulse source delivering a train of trilevel pulses, inclusive of first pulse components exhibiting a first voltage level, second pulse components exhibiting a second voltage level lower than said first voltage level, and third pulse components exhibiting a third voltage level intermediate said first and second voltage levels, to a pulse input terminal; said decoder comprising:

a source of DC potential;

a voltage divider, connected across said DC potential source and having a plurality of divider output terminals at which respectively different reference voltages appear;

a first voltage comparator, having a reference input and a signal input, said reference input being connected to one of said divider output terminals to receive one of said reference voltages; said first voltage comparator exhibiting a first state of operation when the voltage at its signal input is below a first threshold potential related to said one reference voltage and exhibiting a second state of operation when the voltage at its signal input significantly exceeds said first threshold potential, one of said voltage levels of said trilevel pulse train components lying below said first threshold potential whereas the next higher of said voltage levels of said trilevel pulse train components significantly exceeds said first threshold potential;

first coupling means for coupling said pulse input terminal to said signal input of said first voltage comparator;

a second voltage comparator, having a reference input and a signal input, said reference input being connected to another of said divider output terminals to receive a second one of said reference voltages; said second voltage comparator exhibiting a first state of operation when the voltage at its signal input is below a second threshold potential related to said second reference voltage, and exhibiting a second state of operation when the voltage at its signal input significantly exceeds said second threshold potential; both said one and said next higher of said voltage levels of said trilevel pulse train components significantly exceeding said second threshold potential;

second coupling means for coupling said pulse input terminal to said signal input of said second voltage comparator; and control means, responsive to the operating state of said first voltage comparator, for holding the voltage at said signal input of said second voltage comparator below said second threshold potential when said train of trilevel pulses exhibits said next higher of said voltage levels.

2. Apparatus in accordance with claim 1 wherein said second voltage comparator includes:

first and second transistors of like conductivity type, each having base, emitter and collector electrodes, the emitter electrodes of said first and second transistors being connected to a common source of current, the base electrode of said first transistor being connected to said one divider output terminal, and the base electrode of said second transistor being coupled via said second coupling means to said pulse input terminal; and wherein said control means includes a third transistor of the same conductivity type as said first and second transistors, and also having base, emitter and collector electrodes, the collector electrode of said third transistor being connected to the base electrode of said second transistor, the emitter electrode of said third transistor being connected to a point of fixed potential lower than said second threshold potential, and the base electrode of said third transistor coupled to said first voltage comparator in such manner that said third transistor is rendered conducting when said first voltage comparator exhibits said second state of operation.

3. Apparatus in accordance with claim 2 wherein said second coupling means includes a fourth transistor, of a conductivity type opposite to that of said first and second transistors, disposed in an emitter-follower configuration, with its base electrode connected to said pulse input terminal and its emitter electrode connected to said base electrode of said second transistor.

4. Apparatus in accordance with claim 3 wherein said control means also includes a capacitor connected in shunt with the emitter-collector path of said third transistor, and a resistor connected between the collector electrode of said third transistor and a divider output terminal.

5. Apparatus in accordance with claim 1 wherein said one voltage level corresponds to said first voltage level and said next higher voltage level corresponds to said third voltage level, said apparatus also including:

means, responsive to the state of operation of said first voltage comparator, for forming a first train of monolevel pulses encompassing only the periods of appearance of said first pulse components; and means, responsive to the state of operation of said second voltage comparator, for forming a second train of monolevel pulses encompassing only the periods of appearance of said third pulse components.

6. Apparatus in accordance with claim 5, wherein the output of said sandcastle pulse source exhibits a base level, lower than said second voltage level, during the periods when all of said first, second and third pulse components are absent; said apparatus also including:

a third voltage comparator having a reference input and a signal input, said reference input being connected to a further one of said divider output terminals to receive a further one of said reference voltages; said third voltage comparator exhibiting a first state of operation when the voltage at its signal input is below a third threshold potential related to said further reference voltage, and exhibiting a second state of operation when the voltage at its signal input significantly exceeds said third threshold potential, all of said first, second and third voltage levels significantly exceeding said third threshold potential whereas said base level is below said third threshold potential;

third coupling means for coupling said pulse input terminal to said signal input of said third voltage comparator; and means, responsive to the state of operation of said third voltage comparator, for developing a third train of monolevel pulses encompassing the periods of appearance of said first, second and third pulse components.

7. Apparatus in accordance with claim 6 also including:
means, responsive to the states of operation of said second and third voltage comparators, for forming a fourth train of monolevel pulses encompassing the periods of appearance of said first and second pulse components but absent during the periods of appearance of said third pulse components.

8. Apparatus in accordance with claim 7 wherein said fourth pulse train forming means includes a load; means, responsive to the state of operation of said second voltage comparator, for supplying current to said load only when said second voltage comparator exhibits said first state of operation; and means, responsive to the state of operation of said third voltage comparator, for diverting current from said load when said third voltage comparator exhibits said first state of operation.

9. Apparatus in accordance with claim 7, for use in a color television receiver which displays color images in response to composite video signals inclusive of image-representative signal components, said image-representative signal components being absent during horizontal blanking portions of successive line intervals within periodic field intervals, and also absent during the vertical blanking portion of each field interval; wherein
each of said third pulse components of said trilevel pulse train encompasses a plurality of successive line intervals within a respective one of said vertical blanking portions;
said first pulse components of said trilevel pulse-train normally recur at a line rate, but not during appearances of said third pulse components, and each of said first pulse components is timed to coincide with a backporch segment of the horizontal blanking portion of a line interval; and
said second pulse components of said trilevel pulse train occur during segments of said horizontal and vertical blanking portions not overlapping with said first and third pulse components.

10. A sandcastle pulse decoder for use with a sandcastle pulse source delivering a train of trilevel pulses, inclusive of first pulse components exhibiting a first voltage level, second pulse components exhibiting a second voltage level lower than said first voltage level, and third pulse components exhibiting a third voltage level intermediate said first and second voltage levels, to a pulse input terminal; said decoder comprising:
first voltage comparison means for comparing said train of trilevel pulses with a first reference voltage of a voltage level lying between one of said voltage levels of said train of trilevel pulses and the next higher of said voltage levels of said train of trilevel pulses;
means, including second voltage comparison means for comparing said train of trilevel pulses with a second reference voltage of a voltage level lower than both said one and said next higher of the voltage levels of said train of trilevel pulses and means for normally coupling signals from said pulse input terminal to said second voltage comparison means, for normally developing a keying pulse when said train of trilevel pulses exhibits a voltage level significantly exceeding said second reference voltage; and
control means, coupled to said keying pulse developing means and responsive to an output of said first voltage comparison means, for precluding said keying pulse development when said train of trilevel pulses exhibits said next higher voltage level; said control means comprising means for selectively disabling said signal coupling means in response to said output of said first voltage comparison means.

* * * * *